United States Patent [19]

Shirae et al.

[11] Patent Number: 4,900,900

[45] Date of Patent: Feb. 13, 1990

[54] METHOD AND APPARATUS FOR CONTROLLING A-C POWER BY MEANS OF THYRISTORS FOR A RESISTANCE-TYPE ELECTRIC FURNACE

[75] Inventors: Hiroshi Shirae; Shinichi Shirae, both of Tokyo, Japan

[73] Assignee: Hakko Electric Co., Ltd., Japan

[21] Appl. No.: 302,470

[22] Filed: Jan. 26, 1989

Related U.S. Application Data

[63] Continuation-in-part of Ser. No. 138,497, Dec. 24, 1987, abandoned, which is a continuation-in-part of Ser. No. 20,595, Mar. 2, 1987, abandoned, which is a continuation of Ser. No. 775,592, Sep. 13, 1985, abandoned.

[51] Int. Cl.$^4$ .............................................. H05B 1/02
[52] U.S. Cl. .................................. 219/501; 219/508; 219/483; 219/492; 323/319
[58] Field of Search ............... 219/490, 492, 497, 499, 219/501, 505, 506, 483, 508, 507, 378; 323/319, 233, 236, 369

[56] References Cited

U.S. PATENT DOCUMENTS

| | | | |
|---|---|---|---|
| 4,340,807 | 7/1987 | Raskin et al. | 219/497 |
| 4,377,739 | 3/1983 | Eckert, Jr. et al. | 219/503 |
| 4,400,613 | 8/1983 | Popelish | 219/497 |
| 4,518,839 | 5/1985 | Taguchi et al. | 219/10.55 E |
| 4,645,908 | 2/1987 | Jones | 219/326 |
| 4,672,540 | 6/1987 | Waugh et al. | 219/492 |

Primary Examiner—M. H. Paschall
Attorney, Agent, or Firm—Kane, Dalsimer, Sullivan, Kurucz, Levy, Eisele and Richard

[57] ABSTRACT

A method of controlling a-c power by means of thyristors for resistive electric furnace for achieving a temperature control thereof, comprises providing an output which varies between O and N cycles in response to an input analog signal which also varies between 0 and 100% by a burn-on and -off control at zero crossings of an a-c power source. According to the invention, the output is uniformly distributed throughout a control period comprising N cycle times. The output pattern is transit to another output pattern in response to a new analog input signal at the desired point in time.

7 Claims, 6 Drawing Sheets

METHOD AND APPARATUS FOR CONTROLLING A-C POWER BY MEANS OF THYRISTORS FOR A RESISTANCE-TYPE ELECTRIC FURNACE

RELATED APPLICATIONS

This application is a Continuation-In-Part of U.S. application Ser. No. 138,497 filed Dec. 24, 1987 now abandoned which in turn is a Continuation-In-Part of U.S. application Ser. No. 020,595 filed Mar. 2, 1987 now abandoned which in turn is a Continuation of U.S. application Ser. No. 775,592 filed Sept. 13, 1985, now abandoned.

BACKGROUND OF THE INVENTION a. Field of Invention

The invention relates to a method of controlling a-c power by means of thyristors, which is applied when a resistance-type electric furnace equipped with a transformer for supplying electric power conforming to the resistance heating elements in the furnace is operated and an apparatus for carrying out of the method.

In the field of electrical heating such as an electric furnace, temperature control is essential. In particular, a temperature control of high precision has been demanded recently in order to meet the requirement for quality control and to improve the yield of the furnace. In electric furnaces which employ resistance heating elements or infrared lamps as heat sources, almost all of the arrangements employ controlled rectifier elements such as thyristors or TRIAC's to effect an a-c power control. Most a-c power controls of the prior art which use thyristors achieve a power control by adjusting the firing phase angle.

b. Description of the Prior Art

As the a-c power control through the adjustment of the firing phase angle becomes popular, waveform distortions or equivalently a degradation in the power factor of the a-c power system is becoming a problem. To overcome this problem, a cycle control technique or zero crossing control technique in which the switching takes places at zero crossing of the source voltage is being increasingly applied. In the cycle control technique, a time interval of a suitable length, for example, a time interval corresponding to 120 cycles, is chosen as one control period, and the a-c power control is achieved by suitably changing the ratio of the on time and the off time within the control period (see FIG. 2). While the advantage of the cycle control technique is recognized, it has not gained enough popularity to be substituted for the firing angle control because of the following drawbacks:

(i) To provide an output accuracy of 1%, a control period of about two seconds corresponding to 100 cycle time is required. When detecting an effective voltage, current or power at the controlled output, ripples having about two second cycles must be removed, with resulting difficulty in improving the accuracy of detection. The lag in the detection also increases.

(ii) To change the parameter being controlled during one control period, it is necessary to wait for the next control period to commence before an output can be actually changed, resulting in an increased dead time between a change in the output relative to a change in the input.

(iii) If the length of the control period is reduced to overcome the above disadvantages, there results a reduction in the output accuracy, preventing the desired accuracy of temperature from being attained.

OBJECTIVES AND SUMMARY OF THE INVENTION

An objective of this invention is to provide an economical a-c power control method which eliminates drawbacks such as those mentioned above in a conventional phase control method or a conventional cycle control method and which has an accuracy of control with which a resistance-type electric furnace is operated satisfactorily.

Another objective of this invention is to provide an apparatus for carrying out of the method. These objectives are achieved by an a-c power control method and apparatus for carrying out of the method having structures defined in the attached claims.

In this invention, a particular control period such as that in the conventional cycle control method is not provided. Therefore, the a-c power control method is achieved in which pulses of 0–50 Hz (or 0–60 Hz) corresponding to 0–100% of an analog control signal are output by a voltage-to-frequency converter, and a pair of thyristors are turned on during a pair of positive and negative halves of one cycle of the power source frequency in accordance with the pulses and having a predetermined initial direction. As the result of, the output of the control system assumes a state in which on- and off-intervals are distributed substantially uniformly within the time base and the output from the control system shifts to a new state in which on and off-intervals are uniformly distributed immediately in response to a change in an analog control signal. In this invention, the method and apparatus also prevents voltage fluctuations in the illumination power source, within flicker frequency zone of about 10 Hz especially sensitively influencing a man's vision.

DETAILED DESCRIPTION OF THE INVENTION

This invention will now be described with reference to the accompanying drawings which show an embodiment of this invention.

Figure 1:
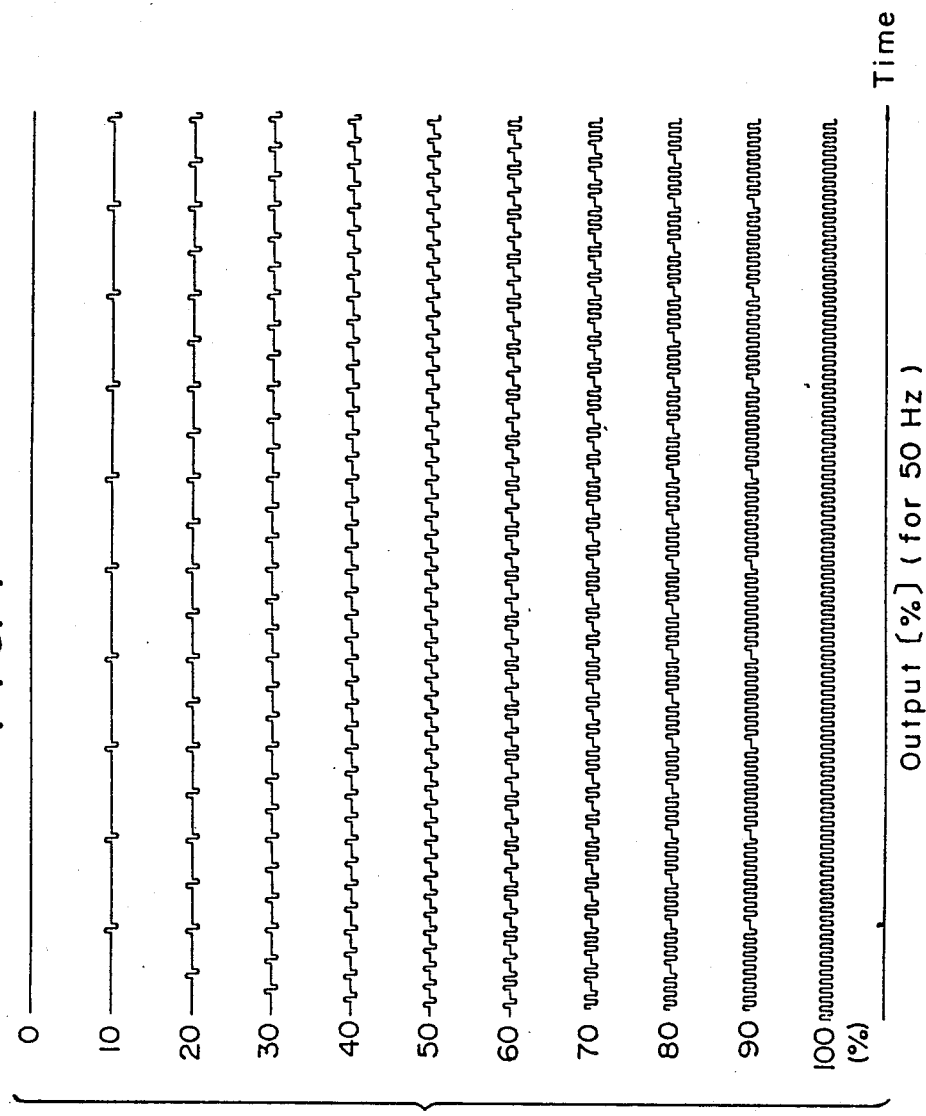
FIG. 1 shows the output wave forms generated by the method of controlling a-c power according to the present invention.

FIG. 1 shows various output waveforms from a control system for a resistance-type electric furnace in response to analog control signals in an alternating current power control method according to this invention. The power source frequency is 50 Hz.

Figure 2:
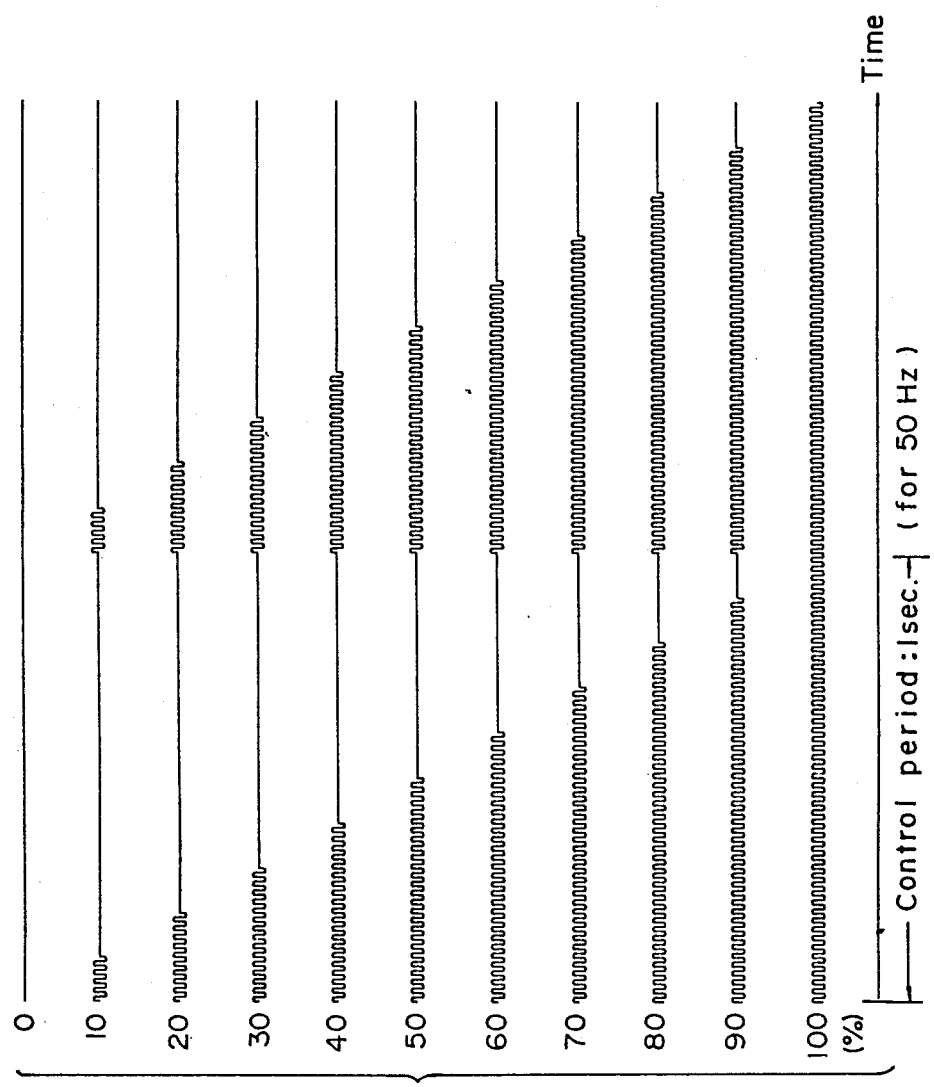
FIG. 2 shows the output wave forms generated by the conventional method of controlling a-c power.

FIG. 2 shows various output waveforms in response to analog control signals in a conventional cycle control method. The axis of ordinates denotes the time base while the axis of abscissas denotes the output waveforms corresponding to various magnitudes of an analog control signal A when the power source frequency is 50 Hz and the control period is 1 second. In this case, the average power in the control period can be controlled, but this method has the aforementioned drawbacks.

In FIG. 1 which relates to the control method according to this invention, various output waveforms are shown corresponding to magnitudes of an analog control signal A along the axis of coordinates, but the outputs in the state in which the flicker frequency zone is eliminated are not shown. In this case, the distribution of the output waveforms along the time base is greatly averaged or more evenly distributed compared to FIG. 2, so that the temperature within a resistance-type electric furnace is stabilized.

Besides the method according to this invention, a method of providing an output waveform such as that shown in FIG. 1 may be achieved, for example, by storing the output patterns shown in FIG. 1 in a memory and selecting an output pattern corresponding to the value of an analog control signal to switch the thyristors. However, in order to improve the output accuracy, a large capacity of memory is required. In addition, it is difficult to perform a basically accurate control of the output when the analog control signal changes to shift to bring about a new pattern. Namely, it is difficult to accurately understand the situation in which the pattern changes, so that it is necessary to provide the function of judgement the timing of signal changes therefor. Thus the cost is high compared to the voltage-to-frequency conversion system mentioned above.

Figure 3:
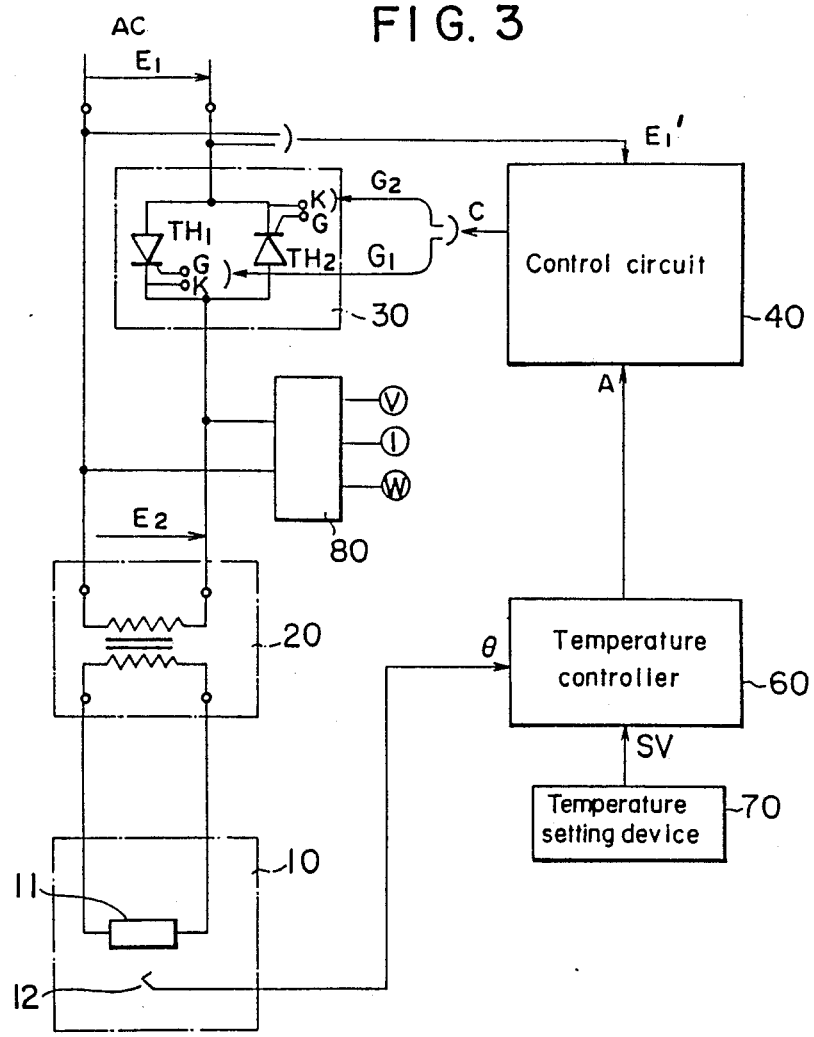
FIG. 3 is a block diagram illustrating an embodiment of power source and a corresponding control circuit for operating a resistance-type electric furnace according to the present invention.

FIG. 3 shows one example of the structure of a power source and a control circuit arrangement according to this invention for energizing a resistance-type electric furnace. The electric furnace 10 is equipped with a resistance heater 11 as a heat source and a thermocouple 12 which senses the temperature of the furnace.

A load matching transformer 20 supplies power to the furnace 10. Transformer 20 is used to step down line voltage $E_2$ (having approximately the same amplitude as the input voltage $E_1$) to a voltage for resistor 11 in furnace 10.

The antiparallel thyristors $TH_1$, $TH_2$ form a semiconductor switch 30 which adjusts the electric power supplied to the furnace 10 in order to set the temperature of the furnace to a desired value, and which supplies to the transformer 20 the voltage and current derived by switching the input $E_1$ from a commercial AC source. The trigger pulses for the gates $G_1$, $G_2$ of the thyristors are supplied by the control unit 40. Each trigger pulse is synchronized with the zero crossing points of line voltage $E_1$ as sensed at input $E_1'$. The time interval between successive trigger signals is inversely proportional to the analog control input signal A from temperature controller 60.

A temperature controller 60 performs a calculation using a PID algorithm from the furnace temperature of $\theta$ and a set point SV from a temperature setting device 70. Setting device 70 is used to store the target temperatures and temperature slopes. Temperature controller 60 and setting device 70 are well known in the art and are not described in further detail. Based on this calculation, the controller 60 provides to the control circuit 40 resulting control variable (0-100%) in the form of an analog control signal A in order to provide electric power to the furnace.

The control circuit 40 in response outputs thyristor drive signals C ($G_1$, $G_2$) to the antiparallel thyristors 30 in order to supply to the electric power corresponding to the analog control signal A from the temperature controller 60. In this case, the voltage supplied to the load includes a pair of positive and negative halves of one sinusoidal cycle of the power source frequency and/or a zero voltage distributed uniformly along the time base.

As shown in FIG. 3, an effective (rms) value converting circuit 80 is interposed between the antiparallel thyristors 30 and the load matching transformer 20 in order to convert the voltage/current supplied to the transformer 20 and smooth effective values because, as will be described later in more detail, the furnace is operated at a frequency proportional to a desired output which is normally lower than the power source frequency, so that the indicating instruments do not provide stable reading due to their pointers being often vibrated.

Figure 4:
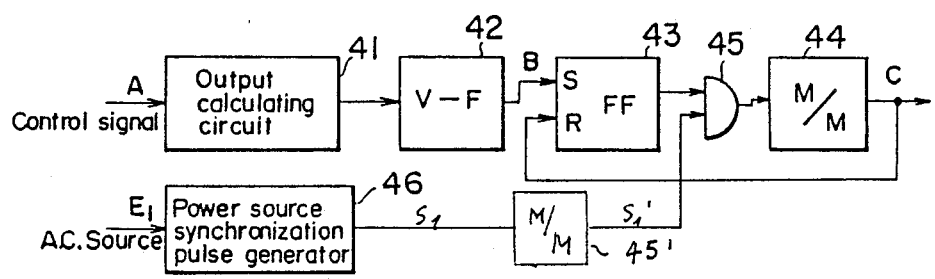
FIG. 4 is a block diagram and FIG. 5 is a more detailed block diagram of the control circuit of FIG. 3.

FIG. 4 is a schematic block diagram of the control circuit 40 and shows only its main elements compared to the more detailed block diagram of FIG. 5 described below. In FIG. 4, an output calculating circuit 41 receives an analog control signal A, and calculates an output in which the non-linearity, boundary conditions, etc., of the control system are corrected. A voltage-to-frequency converter 42 generates a pulse having a maximum frequency which corresponds to the power source frequency (50 or 60 Hz) in accordance with its input signal. A flip-flop 43 is used as a memory to store the signal B output from voltage-to-frequency converter 42 until the positive-going zero cross point of the power source waveform generated immediately after the output B occurs. A monostable multivibrator 44 holds a signal throughout the required time interval in order to generate thyristor drive signals C ($G_1$, $G_2$) corresponding to positive and negative halves of one cycle of the power source frequency. An AND circuit 45 provided between the flip-flop 43 and monostable multivibrator 44 receives the output from a power source synchronization pulse generator 46 through a monostable multivibrator 45' at one input terminal to synchronize the zeros cross points.

Figure 5:
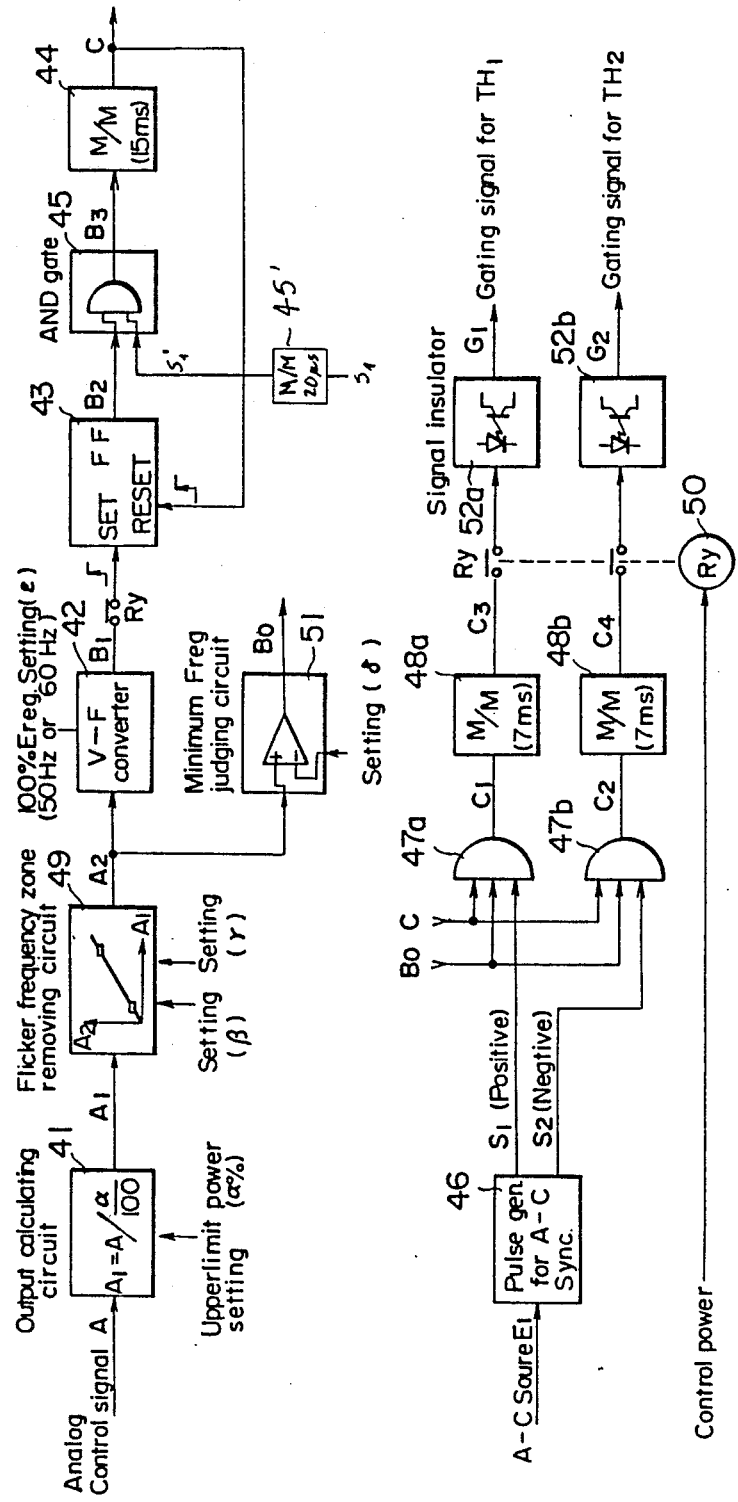

FIG. 5 is a detailed block diagram of the control circuit 40. Like reference numerals identify like elements in FIGS. 4 and 5. The output calculating circuit 41 divides an input analog control signal A by a factor of $\alpha/100$ where $\alpha$ is the ratio of the maximum rated electrical power of the heater to the maximum electrical power available from the line (in %). By this adjustment, the undesirable "OFF" time interval of the thyristors is decreased. The increase in the input power is effectively adjusted by the input voltage in the step-down transformer. The resulting output A is processed in a flicker frequency zone removing circuit 49 which is used to control the power supplied to the electric furnace within a limited range of 0 - $\alpha$% without increasing the power to the furnace up to its rated value when the furnace is being operated under low load. The flicker frequency zone removing circuit 49 converts an input $A_1$ to an output $A_2$. In this circuit, $A_1 = A_2$ for most of the input values $A_1$ while when the input $A_1$ is within a removed zone width $\tau$, the center of which is a removed-frequency set point $\beta$, the output $A_2$ is fixed to $A_2=\beta\pm\tau$. When $A_1$ is within the removed zone width, the center of which is 50 Hz - $\beta$, the output $A_2$ is fixed to $A_2=50$ Hz$-\beta\pm\tau$. Circuit 49 is used when a single line is provided for both illumination of the premises and for the heater. Otherwise, circuit 49 may be removed.

In FIG. 5, a starting delay relay 50 is provided to delay the transmission of signals formed by the respective electronic elements by a predetermined time at the start-up to ensure a safe operation of the entire system.

Figure 6:
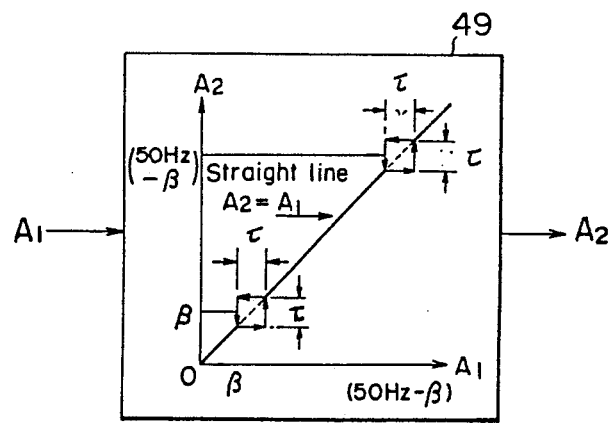
FIG. 6 is a block diagram of the flicker frequency removing circuit.

FIG. 6 shows in an enlarged view the flicker frequency zone removing circuit 49 of FIG. 5 which operates when the quantity of power consumed in the electric furnace cannot be neglected compared to the power reception capacity of a general power consumer. Namely, when voltage fluctuations in the power reception transformer appear as voltage fluctuations in the illumination power source in the consumer's premises, the flicker frequency zone removing circuit prevents voltage fluctuations having about 10 Hz especially sensitively influencing a man's visual sensations. Thus $\beta$ is usually selected to a value $A_2$ (hence $A_1$) corresponding to 10 Hz and $\tau$ to about 5 Hz. When voltage fluctuations in the illumination power source are negligible, or when a plurality of electric furnaces are operated simultaneously even if there are voltage fluctuations in the illumination power source, $\tau$ may be set to substantially 0. The sole capacity of the resistance-type electric furnace is usually about 500 KVA, and does not bring about voltage fluctuations in the distribution system provided by an electric power company, so that if the reception transformer for the illumination power source is separated from the reception transformer for the electric furnace, $\tau$ may be set to 0.

The voltage-to-frequency converter 42 generates a narrow pulse $B_1$ at 0–50 Hz (or 0–60 Hz) corresponding to 0–100% of input signal $A_2$. The time interval from the time when one pulse $B_1$ is output to the time when the next pulse is output is determined by the integrated value of the input signal $A_2$, so that if the input signal fluctuates, the output frequency may be considered to be determined by the average value of the input signal applied during the time interval. Since an average electric furnace has a large heat capacity, and since the temperature sensing thermocouple, an amplifier for the thermocouple output, etc., have time delays, an interpulse interval of about 0.1 seconds does not virtually influence the furnace temperature $\theta$. Therefore, the input $A_2$ to the voltage-frequency converter 42 does not substantially fluctuate in the interval between adjacent output pulses from the flicker frequency removing circuit 49. Thus, it will be understood that although the flicker frequency zone removing circuit 49 does not directly control the output frequency, it inhibits, in consequence, the generation of an output in a desired frequency zone. The details of the voltage-to-frequency converter 42 will be described later with reference to FIGS. 7 and 8.

Contacts Ry are interposed between the voltage-frequency converter 42 and flip-flop 43 comprises an a-contact of the starting delay relay 50 shown in FIG. 5. It is closed in a normal operating state.

The flip-flop 43 as a memory is composed of a D-type flip-flop which is turned on by the rising edge of the output $B_1$ from the voltage-to-frequency converter 42 and turned off by the rising edge of the output signal C from a monostable multivibrator 44.

An AND circuit 45 for synchronization with the power source waveform outputs a signal $B_3$ when the output $B_2$ from the flip-flop 43 and the positive-going half-wave output signal $S_1$ from the power source synchronization pulse generator 46 coincide. The power source synchronization pulse generator 46 generates a pulse output $S_1$ which becomes high during the positive-going half-wave sinusoidal voltage $E_1$ of the AC power source frequency and a pulse signal $S_2$ which becomes high during the negative-going half-wave interval. The rising edge of $S_1$ triggers monostable multivibrator 45' which in response generates a 20 microsecond pulse $S_1'$. The monostable multivibrator 44 generates an output C which maintain its on-state for 15 ms once the output $B_3$ from the AND circuit 45 becomes high. The time interval of 15 ms may be replaced with another time value which is shorter than one cycle time of a 60 Hz frequency, namely, about 16.7 ms, and longer than one-half cycle time of a 50 Hz frequency, namely, about 10 ms.

The minimum frequency judging circuit 51 of FIG. 5 compares to output $A_2$ from the flicker frequency zone removing circuit 49 and the minimum frequency set point $\delta$ and generates a signal $B_0$ which becomes high when $A_2>\delta$. The purpose of this circuit is to inhibit a practically insignificant extremely low frequency such as, for example, 0.001 Hz from being output from the multivibrator 44 as a result of the fact that the voltage-to-frequency converter 42 generates a very low frequency output, for example, of one cycle sometime with the lapse of time even when the input voltage is very close to zero because the voltage-to-frequency converter 42 includes an integrator.

An AND circuit 47a produces a signal $C_1$ from the coincidence of signal $S_1$ indicative of a positive half-wave of the power source, the output C from the monostable multivibrator 44, and the output $B_0$ from the minimum frequency judging circuit 51. AND circuit 47b is the same as the AND circuit 47a except that it responds to a signal $S_2$ indicative of a negative half wave of the power source frequency signal.

Once the output $C_1$ from AND circuit 47a becomes high, the monostable multivibrator 48a generates a high output $C_3$ continuing for 7 ms. The output $C_3$ is input via the contact Ry of the delay relay 50 normally closed to a signal isolator 52a which isolates the control circuit which is of low-dielectric strength from the main switch comprising the thyristors, and may be composed of a photocoupler or the like. The signal isolator 52a generates an output G having the same wave shape as input $C_3$ to drive the thyristor $TH_1$ connected in the positive direction.

The monostable multivibrator 48b and a signal isolator 52b correspond to a negative half wave of the power source frequency waveform and have the same functions as the monostable multivibrator 48a and signal isolator 52a, respectively. The width of the output pulses (7 ms) from the monostable multivibrator 48a and 48b is set to a time value larger than a ¼ cycle time (5 ms) of the 50 Hz power frequency and smaller than a ½ cycle time (8.3 ms) of the 60 Hz power frequency in order to ensure a time interval in which the turn-on current for the thyristors is established by allowing for a delay (¼ cycle) of the excitation current for the transformer and to prevent the thyristor driving from being delayed so as not to shift into the next half one of the power source frequency waveform. Even if the thyristor driving pulses are delayed to shift into the next half waveforms, the thyristors will not be fired if they are connected normally because the opposite-phase voltage is applied across the thyristors. However, if the power source circuit of FIG. 3 is erroneously connected in polarity in construction, a half-wave excitation of the transformer will be performed when the transformer is powered from the power source. Under these circumstances, a dangerous overcurrent may flow through the transformer.

As described above, the starting delay relay 50 is of the delayed type having mechanical contacts and being excited by a control circuit power source to be turned on a predetermined time later. The contacts of the relay 50 are used at three positions, namely, (1) between the voltage-to-frequency converter 42 and flip-flop 43, (2) between the monostable multivibrator 48a and signal insulator 52a, and (3) between the monostable multivibrator 48b and signal insulator 52b. The use of such contacts serves to prevent the occurrence of an accident in which a thyristor driving signal is output during establishment of the control power source to half-wave excitation to the load matching transformer 20 to thereby cause a large current to flow through the transformer 20.

Figure 7:
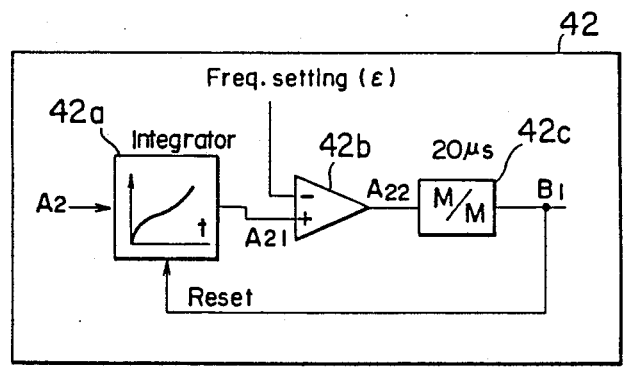
FIG. 7 is a block diagram of the voltage-to-frequency converter.
Figure 8:
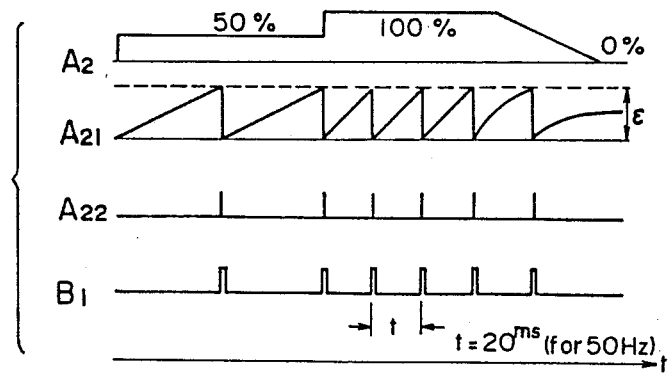
FIG. 8 shows the signal wave forms for the converter of FIG. 7.

FIG. 7 is a block diagram showing the basic structure of the voltage-to-frequency converter 42. FIG. 8 is a timing chart showing the relationship between signals at the respective elements shown in FIG. 7. The input signal $A_2$ is integrated by an integrator 42a to become a signal $A_{21}$, which is then compared at a comparator 42b with a frequency setting signal $\epsilon$. Thus a signal $A_{22}$ becomes high when the signal $A_{21}$ is greater than $\epsilon$. When the signal $A_{22}$ becomes high, a monostable multivibrator 42c generates a pulse $B_1$ having a pulse width of 20 microseconds. Pulse $B_1$ returns the integrated value of the integrator 42a to 0. Therefore, the signals $A_{21}$ and $A_{22}$ are reset to a low value when the pulse $B_1$ is positive. When the signal $A_1$ has a maximum value of 100%, either a 50 Hz or a 60 Hz output may be generated by changing $\epsilon$ in accordance with the power source frequency 50 or 60 Hz using the above function. It will be understood that the timing with which the output pulse $B_1$ is generated is independent of the zero cross points of the power source frequency waveform and that the interval between adjacent output pulses $B_1$ is accurately inversely proportional to the integrated value of $A_2$ for the pulse interval.

Figure 9:
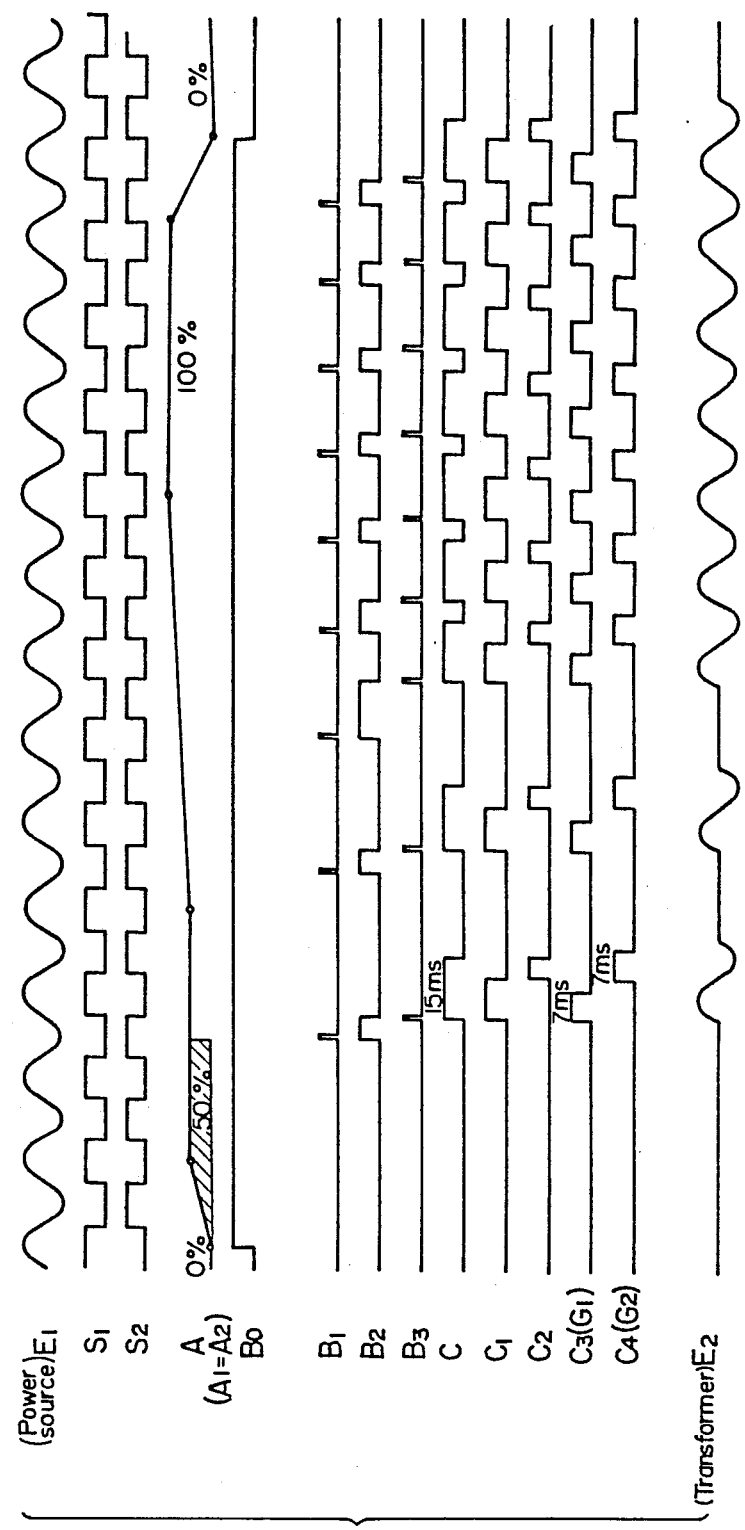
FIG. 9 is a time chart showing the signal wave forms for the invention.

FIG. 9 is a timing chart for signals at the respective elements of the control circuit. The analog control signal A is indicated as changing rapidly because of space consideration. Actually, it takes a longer time for the signal A to change. The reference characters represent the corresponding signals as follows:

$E_1$: power source voltage,
$S_1$, $S_2$: the positive and negative outputs from power source synchronization pulse generator 46,
A: analog control signal,
$B_0$: the output from minimum frequency judging circuit 51,
$B_1$: the output from voltage-to-frequency converter 42,
$B_2$: the output from flip-flop 43,
$B_3$: the output from AND circuit 45,
C: the output from monostable multivibrator 44,
$C_1$: the output from AND circuit 47a,
$C_2$: the output from AND circuit 47b,
$C_3$ ($G_1$): the output from monostable multivibrator 48a,
$C_4$ ($G_2$): the output from monostable multivibrator 48b, and
$E_2$: the input waveform to the transformer.

It can be seen from FIG. 9 that the signal provided to transformer 20 consists of a plurality of evenly spaced complete cycles.

The control method according to this invention can advantageously be performed by utilizing the circuit of the embodiment disclosed herein.

What is claimed is:

1. An apparatus for controlling the a-c power for an electric furnace comprising:

a switching unit for connected to an a-c power supply line with a sinusoidal line voltage at a line frequency and having two antiparallel connected thyristors;

a transformer for connected between said switching unit and the electric furnace;

a temperature controller receiving a temperature sensing signal from said furnace to generate an analog control output; and a control unit for triggering the thyristors in accordance with said analog control signal, said control unit including:

a presetting circuit for scaling said analog control signal;

a voltage-frequency converter connected to said presetting circuit for generating pulses with spacing in an inverse proportion to said analog control signal;

a zero point synchronization unit for generating a first and second series of square pulses corresponding to the positive and negative half-cycles of said line voltage synchronized with the zero cross points of said line voltage;

a cycle synchronization stage connected to said voltage-frequency converter and said zero-point synchronization unit for generating square pulses having a width of $\frac{1}{2}$ to $\frac{3}{4}$ the width of a cycle of the line frequency, and having a start position corresponding to the zero cross point of the line voltage;

a trigger pulse generating stage for generating trigger pulses for said thyristors from said square pulses from the cycle synchronization stage, said trigger pulses being transmitted to the gates of the thyristors.

2. The apparatus according to claim 1, wherein the control loop in said control unit includes a flicker spectrum eliminating circuit.

3. The apparatus according to claim 1, wherein said cycle synchronization stage comprises a flip-flop receiving said signals from said voltage-frequency convertor and AND gate for synchronizing the start point of the output signal of said flip-flop with the zero cross point of the line voltage, and a monostable multivibrator generating a pulse having a width of $\frac{1}{2}$ to $\frac{3}{4}$ the width of a cycle of the line frequency with substantially zero delay time.

4. The apparatus of claim 1 further comprising a low frequency signal limit circuit for generating a rejection signal when said analog signal is below a preset level.

5. The apparatus according to claim 4, wherein said trigger pulse generating stage includes two parallel circuits having a three input AND gate and a monostable multivibrator, each AND gate receiving three input signals, respectively from a square pulse from said zero point synchronization unit, the rejection signal from said low frequency limit circuit, and the square pulse from said cycle synchronization stage.

6. An apparatus according to claim 1 further comprising a signal isolating means isolating said control unit from said switching unit.

7. The apparatus of claim 6 wherein said signal isolation means comprises a photo coupler.

* * * * *